United States Patent
Muto et al.

(10) Patent No.: US 11,809,580 B2
(45) Date of Patent: Nov. 7, 2023

(54) UPDATE DEVICE AND UPDATE METHOD

(71) Applicant: NIPPON TELEGRAPH AND TELEPHONE CORPORATION, Tokyo (JP)

(72) Inventors: Kenichiro Muto, Tokyo (JP); Takeshi Nakatsuru, Tokyo (JP); Kazumi Kinoshita, Tokyo (JP); Kimihiro Yamakoshi, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 204 days.

(21) Appl. No.: 17/421,719

(22) PCT Filed: Dec. 20, 2019

(86) PCT No.: PCT/JP2019/050224
§ 371 (c)(1),
(2) Date: Jul. 8, 2021

(87) PCT Pub. No.: WO2020/145100
PCT Pub. Date: Jul. 16, 2020

(65) Prior Publication Data
US 2022/0092195 A1    Mar. 24, 2022

(30) Foreign Application Priority Data
Jan. 11, 2019  (JP) .................. 2019-003731

(51) Int. Cl.
*G06F 8/65*       (2018.01)
*G06F 21/51*      (2013.01)
(Continued)

(52) U.S. Cl.
CPC .... *G06F 21/604* (2013.01); *G06F 2221/2141* (2013.01)

(58) Field of Classification Search
CPC .. G06F 21/604; G06F 2221/2141; G06F 8/65; G06F 21/51; G06F 21/57; H04L 63/101
See application file for complete search history.

(56) References Cited

U.S. PATENT DOCUMENTS

| | | | |
|---|---|---|---|
| 9,374,390 B1 * | 6/2016 | Teal | G06F 21/554 |
| 2011/0239227 A1 * | 9/2011 | Schaefer | G06F 21/62 |
| | | | 719/313 |

(Continued)

OTHER PUBLICATIONS

"Understanding AppLocker rule condition types" Oct. 26, 2015, MSDN Library, [online] Retrieval Date: Nov. 28, 2018 website: URL:https://msdn.microsoft.com/ja-jp/library/ee460959(v=ws.11).aspx.

*Primary Examiner* — Joseph P Hirl
*Assistant Examiner* — Aayush Aryal

(57) ABSTRACT

An update device includes processing circuitry configured to store package management information that includes associations between files and packages including the files and information indicating existence/non-existence of dependence relationships among the packages, and an access control list that includes associations between the files and access source files permitted to access the files, refer, when a combination of a file and an access source file is specified, to the package management information to identify a package including the file and a package including the access source file, and add, when the identified package including the file and the identified package including the access source file are the same or are mutually in a dependence relationship, the specified combination to the access control list.

7 Claims, 8 Drawing Sheets

(51) Int. Cl.
    *G06F 21/57*     (2013.01)
    *H04L 9/40*     (2022.01)
    *G06F 21/60*     (2013.01)

(56) References Cited

U.S. PATENT DOCUMENTS

| | | | |
|---|---|---|---|
| 2015/0222636 A1* | 8/2015 | Mahaffey | G06F 21/564 |
| | | | 726/4 |
| 2016/0234341 A1* | 8/2016 | Dare | H04L 67/04 |
| 2017/0054760 A1* | 2/2017 | Barton | H04L 63/0823 |
| 2017/0272442 A1* | 9/2017 | Klimovs | H04L 63/101 |
| 2018/0107501 A1* | 4/2018 | Roth | H04L 67/02 |

* cited by examiner

Fig. 3

| PACKAGE | DEPENDENCE DESTINATION | FILE |
|---|---|---|
| openssl | – | /···/openssl |
| | | /···/openssl.conf |
| | | ... |
| httpd | – | /···/httpd |
| | | /···/httpd.conf |
| | | ... |
| mod_ssl | openssl httpd | /···/mod_ssl |
| | | /···/ssl.conf |
| | | ... |
| emacs | – | /···/emacs |
| | | /···/emacs.appdata.xml |
| | | ... |

Fig. 4

ACL                                                14b

| ACCESS SOURCE FILE | ACCESS DESTINATION FILE |
|---|---|
| /···/openssl | /···/openssl.conf |
| /···/httpd | /···/httpd.conf |
| ... | |

UPDATE DEVICE AND UPDATE METHOD

CROSS-REFERENCE TO RELATED APPLICATIONS

This application is a U.S. 371 Application of International Patent Application No. PCT/JP2019/050224, filed on 20 Dec. 2019, which application claims priority to and the benefit of JP Application No. 2019-003731, filed on 11 Jan. 2019, the disclosures of which are hereby incorporated herein by reference in their entireties.

TECHNICAL FIELD

The present invention relates to an update device and an update method.

BACKGROUND ART

Conventionally, for control communication equipment such as a server, access control techniques to control permission/rejection of access to a file have been considered. For example, a technique to permit execution of only access to an execution file, for which integrity has been confirmed, based on an access control list (hereinafter also referred to as an ACL) set in advance is proposed (see Non-Patent Literature 1). An access control technique is also proposed in which a process permitted to access files is set in advance, and access to the files is monitored for every process so that processes other than the specified process cannot access the files.

CITATION LIST

Non-Patent Literature

Non-Patent Literature 1: "Understanding AppLocker rule condition types", [online] Oct. 26, 2015, MSDN Library, [retrieved on Nov. 28, 2018], Internet <URL:https://msdn.microsoft.com/ja-jp/library/ee460959(v=ws.11).aspx>

SUMMARY OF THE INVENTION

Technical Problem

In the conventional techniques, however, there may be a case where it is difficult to appropriately set an ACL that indicates access control policies. For example, in the conventional techniques, an ACL with access control policies for confirming integrity of a file based on correspondence of a hash value of the file is set. On the other hand, for a file for which it is difficult to define a hash value in advance, an access control technique of, by setting in advance a process permitted to access the file, limiting processes that can access the file is applied. However, if an execution file of such a process of accessing the file is falsified, access from the falsified process may be permitted.

Therefore, a technique is proposed in which, for each access destination file to be targeted by access control, an execution file of a process permitted to access the file is set as an access source file, and the access destination file and the access source file are set in the ACL.

Here, at the time of setting an ACL using access destination files and access source files, an ACL with an inappropriate access control policy may be set. For example, in the case of an operator himself creating an access control policy and updating an ACL during operation of a system, there may be a case where an access control policy that does not need to be set may be created and carelessly applied. Further, in the case of updating an ACL, utilizing an access control policy crated by a third person, for example, at the time of installing software, there may be a case where the access control policy is utilized without being noticed to be a malicious access control policy. In any of the cases, there is a possibility that the security level of the ACL decreases, which may cause a security hole.

The present invention has been made in view of the above, and an object is to restrict addition of an inappropriate access control policy to appropriately set an access control list.

Means for Solving the Problem

In order to solve the problem described above and achieve the object, an update device according to the present invention includes: processing circuitry configured to: store package management information that includes associations between files and packages including the files and information indicating existence/non-existence of dependence relationships among the packages, and an access control list that includes associations between the files and access source files permitted to access the files; refer, when a combination of a file and an access source file is specified, to the package management information to identify a package including the file and a package including the access source file; and add, when the identified package including the file and the identified package including the access source file are the same or are mutually in a dependence relationship, the specified combination to the access control list.

Effects of the Invention

According to the present invention, it becomes possible to restrict addition of an inappropriate access control policy to appropriately set an access control list.

BRIEF DESCRIPTION OF DRAWINGS

FIG. 3 is a diagram illustrating a data configuration of package management information.

FIG. 4 is a diagram illustrating a data configuration of an ACL.

DESCRIPTION OF EMBODIMENT

Figure 1:
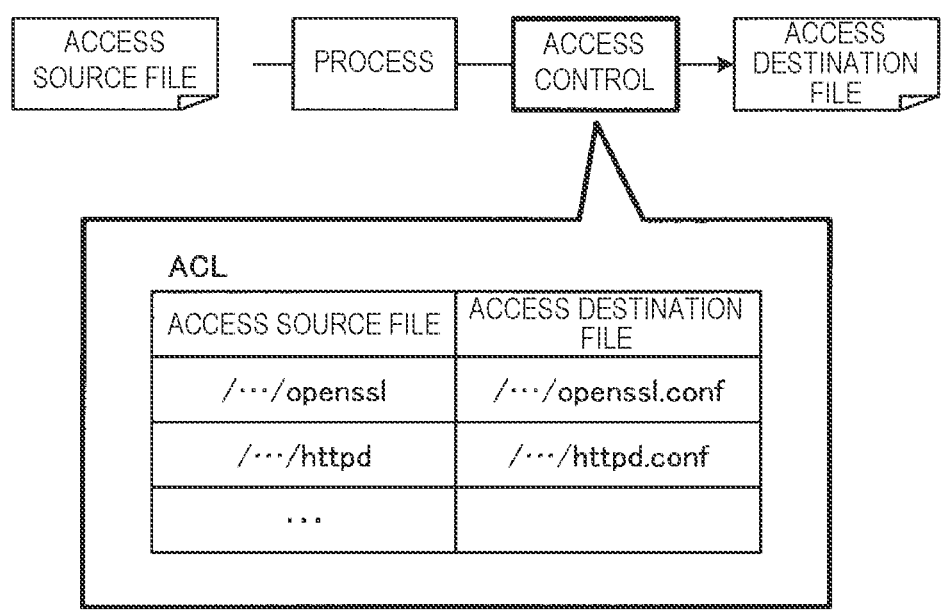
FIG. 1 is a diagram for describing an outline of a process of an access control device.

An embodiment of the present invention will be described below is detail with reference to drawings. Note that the present invention is not limited by the embodiment. In description of the drawings, the same units are shown being given the same reference numeral.

[Outline of process of access control device] An update device of the present embodiment performs as update process of updating an ACL used for access control of an access control device. First, FIG. 1 is a diagram for describing an outline of a process of the access control device. As shown in FIG. 1, when detecting a process of accessing an access destination file targeted by access control, the access control device performs access control to control permission/rejection to the access destination file by this process, based on an ACL indicating access control policies.

For example, only when an execution file of a detected process is set as an access source file for an access destination file in the ACL set in advance, the access control device permits the process to access the access destination file. The access control device confirms integrity of both of the access destination file and the access source file based on the ACL and permits access.

The update device of the present embodiment performs the update process of updating the ACL of the access control device. Here, if permission of unnecessary access between files is carelessly added to the ACL, there is a possibility that the security level decreases, which may cause a security hole.

Note that package management information such as RPM (RPM Package Manager) of Linux (registered trademark) is known. The package management information is information to collect and manage execution files, setting files, library files and the like. Each package includes at least an execution file to be included at the time of installation. Files to be generated after installation may be included. The package management information includes information indicating dependence relationships among packages assumed by a software package developer, the information indicating which software of which package requires which software of which package, that is, which package depends on which package.

Therefore, the update device of the present embodiment executes the ACL update process of restricting at least unnecessary addition to the ACL in consideration of whether access is access between files assumed by the software package developer or not, using the package management information.

Note that, though an update device 10 is a device implemented in hardware different from the access control device in the description below, the update device 10 may be a device incorporated in the access control device.

Figure 2:
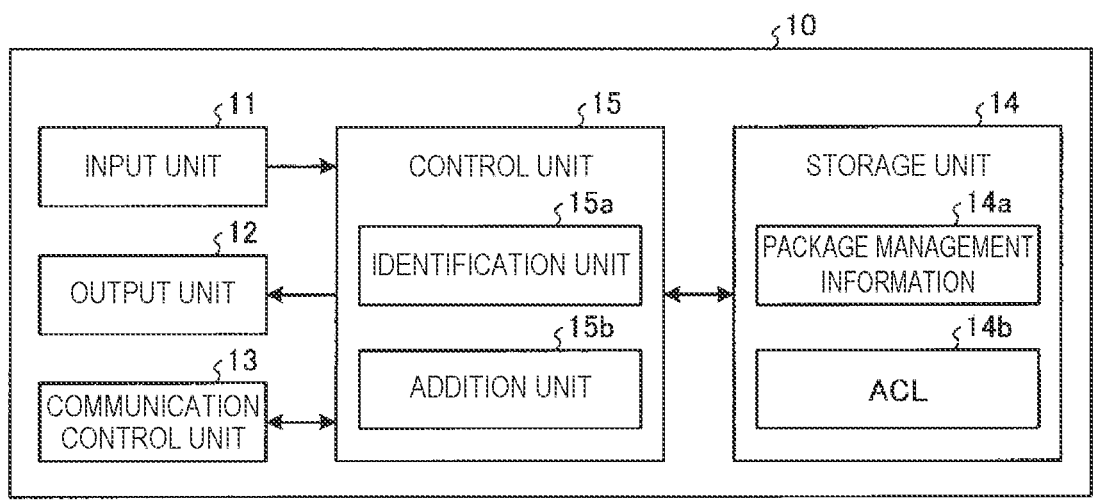
FIG. 2 is a schematic diagram illustrating a schematic configuration of an update device of the present embodiment.

[Configuration of update device] FIG. 2 is a schematic diagram illustrating a schematic configuration of the update device of the present embodiment. As illustrated in FIG. 2, the update device 10 is realized by a general-purpose computer such as a personal computer and is provided with an input unit 11, an output unit 12, a communication control unit 13, a storage unit 14 and a control unit 15.

The input unit 11 is realized by input devices such as a keyboard and a mouse, and inputs various kinds of instruction information for start of a process and the like, to the control unit 15, according to an input operation by an operator. The output unit 12 is realized by a display device such as a liquid crystal display, a printing device such as a printer, and the like.

The communication control unit 13 is realized by an NIC (network interface card) or the like and controls communication between external devices and the control unit 15 via a telecommunication line such as a LAN (local area network) and the Internet. For example, the communication control unit 13 controls communication between external devices, such as a management device managing the package management information used for the update process to be described later, the access control device managing the ACL targeted by the update process and a file management system managing a lot of files, and the control unit 15.

The storage unit 14 is realized by a semiconductor memory element such as a RAM (random access memory) and a flash memory, or a storage device such as a hard disk and an optical disk. In the present embodiment, the storage unit 14 stores package management information 14a and an ACL 14b. Note that the storage unit 14 may be configured to communicate with the control unit 15 via the communication control unit 13.

FIG. 3 is a diagram illustrating the package management information 14a. The package management information 14a includes associations between files and packages including the files, and information indicating existence/non-existence of dependence relationships among the packages. Each package includes at least an execution file to be included at the time of installation and files to be generated after installation.

Specifically, the package management information 14a is information in which, for each package, a dependence destination package and files included in the dependence destination package are associated as shown in FIG. 3. The dependence source package requires a dependence destination package in order to cause the dependence source package to function. In the example shown in FIG. 3, it is illustrated that, for example, a package "openssl" includes files "/ . . . /openssl", "/ . . . /openssl.conf" and the like. Further, it is illustrated that dependence destination packages the dependence source of which is a package "mod_ssl" are "openssl" and "httpd". Here, "/ . . . /" is an expression indicating omission of a file path. As for the package "openssl", it is illustrated that there is not a dependence destination package assumed by the software package developer.

In the present embodiment, the update device 10 acquires the package management information 14a via the input unit 11 or the communication control unit 13 and causes the package management information 14a to be stored into the storage unit 14 in advance prior to the update process to be described later.

FIG. 4 is a diagram illustrating the ACL 14b. The ACL 14b includes associations between files and access source files permitted to access the files. In other words, the ACL 14b is a white list specifying access source files permitted to access destination files as described above.

In the example shown in FIG. 4, it is illustrated that, for example, access from an access source file "/ . . . /openssl" to an access destination file "/ . . . /openssl.conf" is permitted.

In the present embodiment, the update device 10 acquires the ACL 14b of the access control device via the input unit 11 or the communication control unit 13 and causes the ACL 14b to be stored into the storage unit 14 in advance prior to the update process to be described later.

The control unit 15 is realized using a CPU (central processing unit) or the like, and executes a processing program stored in the memory. Thereby, the control unit 15 functions as an identification unit 15a and an addition unit 15b as illustrated in FIG. 4.

If a combination of an access destination file and an access source file is specified, the identification unit 15a refers to the package management information 14a to identify a package including the access destination file and a package including the access source file.

Specifically, if an operator specifies a combination of an access destination file and an access source file as an access control policy to be added to the ACL 14*b*, via the input unit 11 or the communication control unit 13, the identification unit 15*a* refers to the package management information 14*a* first. Then, the identification unit 15*a* identifies packages including the specified access destination file and access source file, respectively.

For example, in the example shown in FIG. 3, when a combination of the access destination file "/ . . . /openssl" and the access source file "/ . . . /mod_ssl" is specified, the identification unit 15*a* identifies the package "openssl" of the access destination file. Further, the identification unit 15*a* identifies the package "mod_ssl" of the access source file.

If the identified package including the file and the identified package including the access source file are the same or are mutually in a dependence relationship, the addition unit 15*b* adds the specified combination to the ACL 14*b*.

Figure 5:
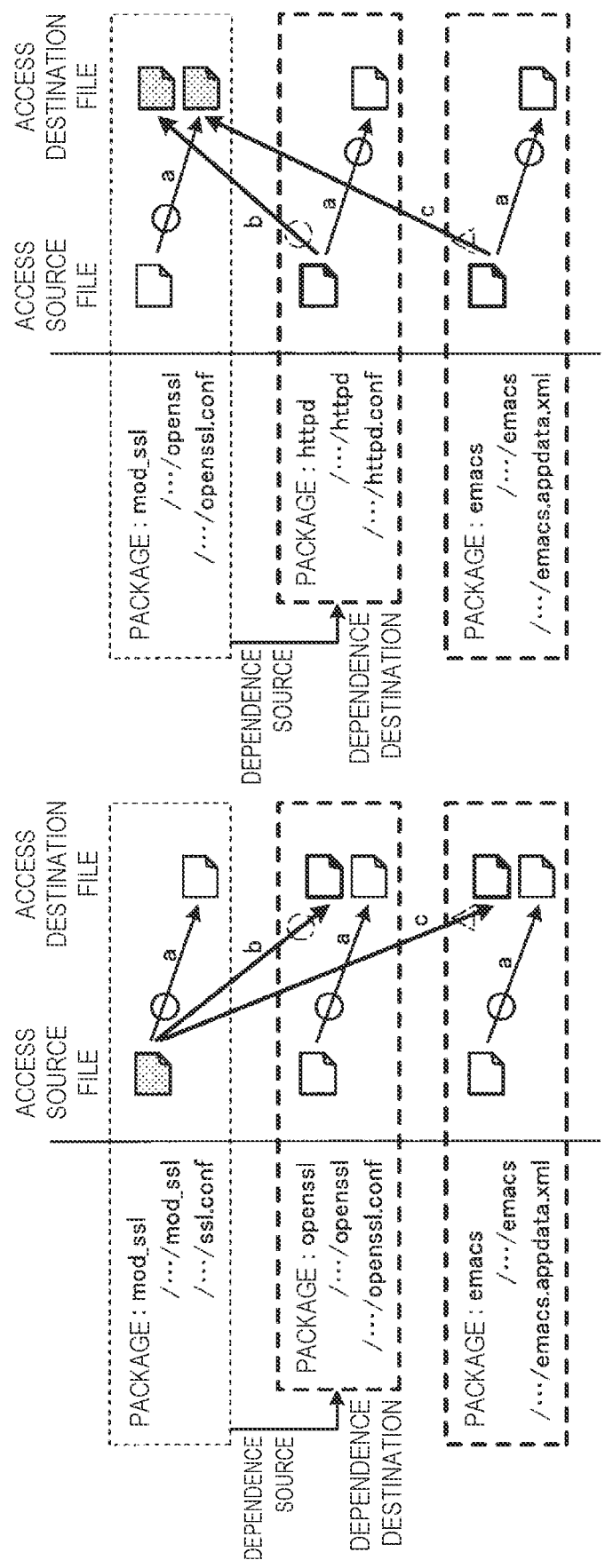
FIG. 5 is a diagram for describing a process of an addition unit.
Figure 6:
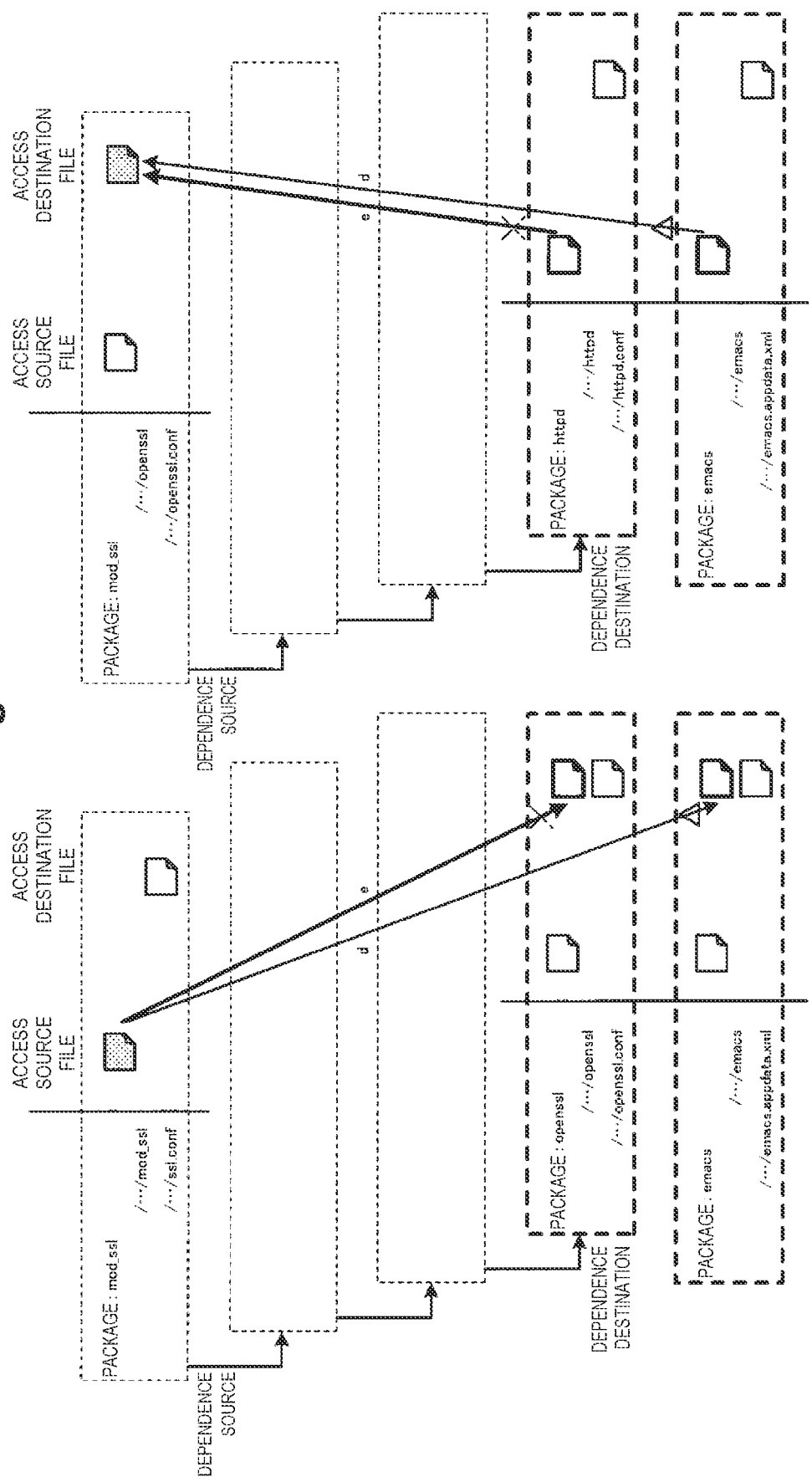
FIG. 6 is a diagram for describing the process of the addition unit.

Here, FIGS. 5 and 6 are explanatory diagrams for describing a process of the addition unit 15*b*. If a package of an access source file and a package of an access destination file are the same as shown by an arrow a in FIG. 5, the addition unit 15*b* adds the specified combination to the ACL 14*b*.

Further, when a package of an access source file and a package of an access destination file are in a mutual dependence relationship, that is, the packages are mutually dependence source or dependence destination packages, the addition unit 15*b* adds the specified combination to the ACL 14*b*. For example, a combination shown by an arrow b in FIG. 5 is regarded as an access control policy required for cooperation between a dependence source package and a dependence destination package and added to the ACL 14*b*.

Note that, when a package including an access destination file and a package including an access source file are different from each other and are mutually in a dependence relationship, the addition unit 15*b* may further output a warning. Further, when a package including an access destination file and a package including an access source file are different from each other and are mutually in a dependence relationship, the addition unit 15*b* may reject addition or accept an instruction to permit/reject addition, instead of addition of the specified combination to the ACL 14*b*.

In other words, there is a possibility that a wrong access control policy about files in a dependence relationship decreases the security level. Therefore, the addition unit 15*b* may output a warning to refer to whether the combination shown by the arrow b in FIG. 5 violates the access control scheme or not or request the operator to approve permission/rejection of addition to the ACL 14*b*. Or alternatively, the addition unit 15*b* may indiscriminately reject addition to the ACL 14*b* in accordance with the operation scheme.

If a package including an access destination file and a package including an access source file are different from each other, are not mutually in a dependence relationship, and are not in the dependence relationship via another package, the addition unit 15*b* adds the specified combination to the ACL 14*b*.

For example, a combination shown by an arrow c in FIG. 5 is an access control policy between independent packages that are not mutually in a dependence relationship, and there is a possibility that the combination may be access between files required by the operator though it is unexpected by the software package developer. Therefore, the addition unit 15*b* adds the combination to the ACL 14*b*.

Further, as for a combination shown by an arrow d in FIG. 6, an access source package and an access destination package cannot be linked even via another package. Therefore, similarly to the combination shown by the arrow c in FIG. 5, the combination shown by the arrow d in FIG. 6 is an access control policy between independent packages, and there is a possibility that the combination is necessary access between files. Therefore, the addition unit 15*b* adds the combination to the ACL 14*b*.

Note that, when a package including an access destination file and a package including an access source file are different from each other, are not mutually in a dependence relationship, and are not in the dependence relationship via another package, the addition unit 15*b* further outputs a warning.

For example, as for the combination shown by the arrow c in FIG. 5 and the combination shown by the arrow d in FIG. 6, it cannot be affirmed that the combinations are not wrong access control policies. Therefore, the addition unit 15*b* outputs the warning to leave the determination to the operator. For example, the addition unit 15*b* outputs a warning to refer to whether the combination does not violate the access control scheme.

If a package including an access destination file and a package including an access source file are different from each other, are not mutually in a dependence relationship, and are not in the dependence relationship via another package, the addition unit 15*b* may reject addition or accept an instruction to permit/reject addition, instead of addition of the specified combination to the ACL 14*b*. In other words, the addition unit 15*b* may request the operator to approve permission/rejection of addition to the ACL 14*b*. Or alternatively, as for the combination, the addition unit 15*b* may indiscriminately reject addition to the ACL 14*b*.

Further, as for a combination other than the above, that is, such a combination that a package including an access destination file and a package including an access source file are in a dependence relationship via another package, shown by an arrow e in FIG. 6, the addition unit 15*b* does not perform addition to the ACL 14*b*. When there is not a mutual direct dependence relationship between a package including an access destination file and a package including an access source file, there is a strong possibility that the access is access that is not assumed by the software package developer. If such access is carelessly permitted, there is a possibility that the security level of the ACL 14*b* decreases. Therefore, regarding such a combination as addition of an unnecessary access policy, the addition unit 15*b* does not perform addition to the ACL 14*b*.

However, when there is not a mutual direct dependence relationship between a package including an access destination file and a package including an access source file, but the packages are in the dependence relationship via another package, a definition of the dependence relationship may be omitted, or the definition may be missing in the package mange information.

Therefore, when there is not a mutual direct dependence relationship between a package including an access destination file and a package including an access source file, but the packages are in the dependence relationship via another package, the addition unit 15*b* may request the operator to approve permission/rejection of addition to the ACL 14*b*. Or alternatively, the addition unit 15*b* may indiscriminately add the combination and output a warning to leave the determination to the operator. Thereby, it is possible to, without indiscriminately rejecting addition when there is an indirect dependence relationship between packages, perform addition to the ACL 14*b* in the case of omission of a definition or missing of the definition in the package management information.

Note that the addition unit 13b outputs the ACL 14b updated by the update process to the access control device. Thereby, it becomes possible for the access control device to apply the updated ACL 14b and control permission/rejection of access between files.

Figure 7:
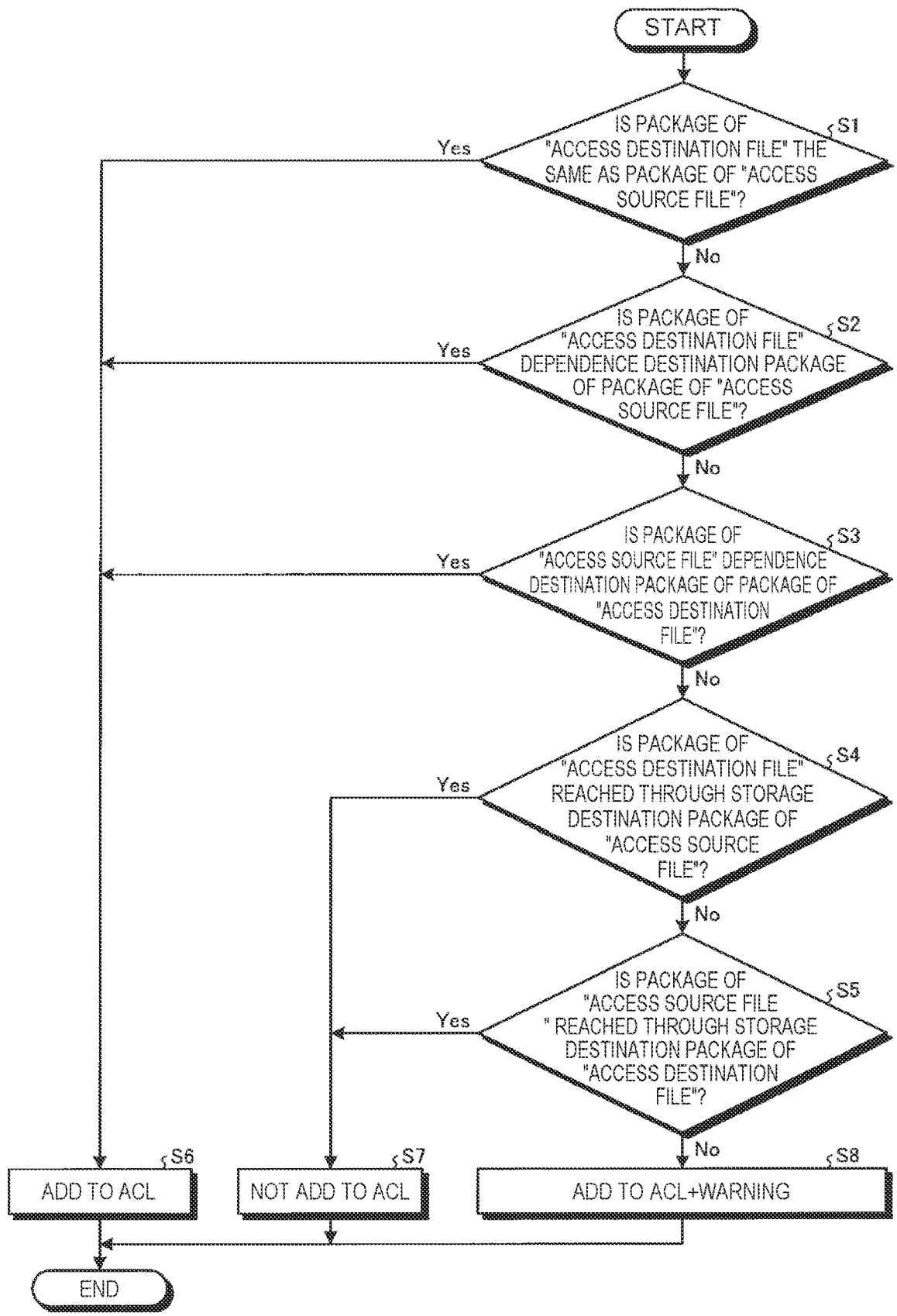
FIG. 7 is a flowchart showing an update process procedure.

[Update Process] Next, the update process by the update device 10 according to the present embodiment will be described with reference to FIG. 7. FIG. 7 is a flowchart showing an update process procedure. The flowchart in FIG. 7 is started, for example, at a timing of the user performing an operation input to give a start instruction.

First, the identification unit 15a accepts an input specifying a combination of an access destination file and an access source file. Further, the identification unit 15a refers to the package management information 14a to identify a package including the access destination file and a package including the access source file.

Then, the addition unit 15b confirms whether the identified package including the access destination file and the identified package including the access source file are the same or not (step S1). When the identified package including the access destination file and the identified package including the access source file are the same (step S1: Yes), the addition unit 15b adds the specified combination to the ACL 14b (step S6).

On the other hand, when the packages are not the same (step S1: No), the addition unit 15b confirms whether the identified package including the file and the identified package including the access source file are mutually in a dependence relationship or not. First, the addition unit 15b confirms whether the identified package including the access destination file is a dependence destination of the package including the access source file or not (step S2). When the package including the access destination file is the dependence destination of the package including the access source file (step S2: Yes), the addition unit 15b adds the specified combination to the ACL 14b (step S6).

On the other hand, when the package including the access destination file is not the dependence destination of the package including the access source file (step S2: No), the addition unit 15b confirms whether the package including the access source file is a dependence destination of the package including the access destination file (step S3). When the package including the access source file is the dependence destination of the package including the access destination file (step S3: Yes), the addition unit 15b adds the specified combination to the ACL 14b (step S6).

Note that, when the package including the access destination file and the package including the access source file are different from each other and are mutually in the dependence relationship (step S2: Yes; step S3: Yes), the addition unit 15b may accept an instruction to permit/reject addition, instead of addition of the specified combination to the ACL 14b. Specifically, the addition unit 15b may output a warning to refer to whether the specified combination violates the access control scheme or request the operator to approve permission/rejection of addition to the ACL 14b. Or alternatively, the addition unit 15b may indiscriminately reject addition to the ACL 14b in accordance with the operation scheme.

On the other hand, when the package including the access source file is not the dependence destination of the package including the access destination file (step S3: No), the addition unit 15b confirms whether the package including the access destination file and the package including the access source file are not in the dependence relationship via another package.

First, the addition unit 15b confirms whether the package of the access destination file is reached through a dependence destination package of the access source file or not (step S4). When the package of the access destination file is reached through the dependence destination package of the access source file (step S4: Yes), the addition unit 15b does not perform addition of the specified combination to the ACL 14b, regarding the combination as access that is not assumed by the software package developer (step S7).

On the other hand, when the package of the access destination file is not reached through the dependence destination package of the access source file (step S4: No), the addition unit 15b confirms whether the package of the access source file is reached through a dependence destination package of the access destination file (step S5). When the package of the access source file is reached through the dependence destination package of the access destination file (step S5: Yes), the addition unit 15b does not perform addition of the specified combination to the ACL 14b regarding the combination as access that is not assumed by the software package developer (step S7).

On the other hand, when the package of the access source file is not reached through the dependence destination package of the access destination file (step S5: No), the addition unit 15b adds the specified combination to the ACL 14b as an access control policy between independent packages (step S8). Further, the addition unit 15b outputs a warning to leave the determination to the operator.

For example, the addition unit 15b outputs a warning to refer to whether the combination does not violate the access control scheme. Further, the addition unit 15b may request the operator to approve permission/rejection of addition to the ACL 14b. Or alternatively, as for the combination, the addition unit 15b may indiscriminately reject addition to the ACL 14b.

In the process of step S7, the addition unit 15b may request an approval of permission/rejection of addition to the ACL 14b from the operator, instead of indiscriminately rejecting addition. Or alternatively, the addition unit 15b may indiscriminately add the combination and output a warning to leave the determination to the operator. Thereby, it becomes possible to, in the case of omission of a definition or missing of the definition in the package management information, perform addition to the ACL 14b.

Thus, the update process procedure ends. As a result, the update device 10 can restrict addition of at least inappropriate access control policies to update the ACL 14b. Therefore, it becomes possible to minimize lessening of the security level of the ACL 14b.

As described above, in the update device 10 of the present embodiment, the storage unit 14 stores the package management information 14a that includes associations between files and packages including the files and information indicating existence/non-existence of dependence relationships among the packages, and the ACL 14b that includes associations between access destination files and access source files permitted to access the access destination files. When a combination of an access destination file and an access source file is specified, the identification unit 15a refers to the package management information 14a to identify a package including the access destination file and a package including the access source file. When the identified package including the access destination file and the identified package including the access source file are the same or are mutually in a dependence relationship, the addition unit 15b adds the specified combination to the ACL 14b.

Thus, on condition that access is access of a combination in a dependence relationship assumed by the software package developer, the update device 10 can add the combination to the ACL 14b to update the ACL 14b while restricting addition of at least inappropriate access control policies. Therefore, it becomes possible to minimize lessening of the security level of the ACL 14b. Thus, it becomes possible for the update device 10 to appropriate set an ACL.

If a package including an access destination file and a package including an access source file are different from each other and are mutually in a dependence relationship, the addition unit 15b may further output a warning. Or alternatively, the addition unit 15b may reject addition or accept an instruction to permit/reject addition, instead of addition of the specified combination to the ACL 14b. Thereby, it becomes possible to leave permission/rejection of addition to the ACL 14b to determination of the operator.

If a package including an access destination file and a package including an access source file are different from each other, are not mutually in a dependence relationship, and are not in the dependence relationship via another package, the addition unit 15b adds the specified combination to the ACL 14b.

Thereby, it is possible to add an access control policy between independent packages, which is an access control policy between independent packages that may possibly be necessary access between files, to the ACL 14b.

At that time, the addition unit 15b further outputs a warning. Or alternatively, the addition unit 15b may reject addition or accept an instruction to permit/reject addition, instead of addition of the specified combination to the ACL 14b. Thereby, it becomes possible to leave permission/rejection of addition to the ACL 14b to determination of the operator.

Thereby, as for a combination of a package including an access destination file and a package including an access source file that are in a dependence relationship via another package, other than the above, the addition unit 15b can restrict addition of the combination to the ACL 14b. In other words, it is possible to restrict addition of such unnecessary access that there is not a mutual direct dependence relationship between packages and that is possibly access that the software package developer does not assume, to the ACL 14b.

[Program] It is also possible to create a program in which the process executed by the update device 10 according to the above embodiment is written in a computer-executable language. As one embodiment, the update device 10 can be implemented by causing an update program to execute the above update process to be installed in a desired computer as package software or online software. For example, by causing an information processing device to execute the above update program, it is possible to cause the information processing device to function as the update device 10. As the information processing device stated here, a desktop type or notebook type personal computer is included. In addition, mobile communication terminals such as a smartphone, a mobile phone and a PHS (personal handy-phone system), and slate terminals such as a PDA (personal digital assistant) are included in the category of the information processing device. Further, the functions of the update device 10 may be implemented in a cloud server.

Figure 8:
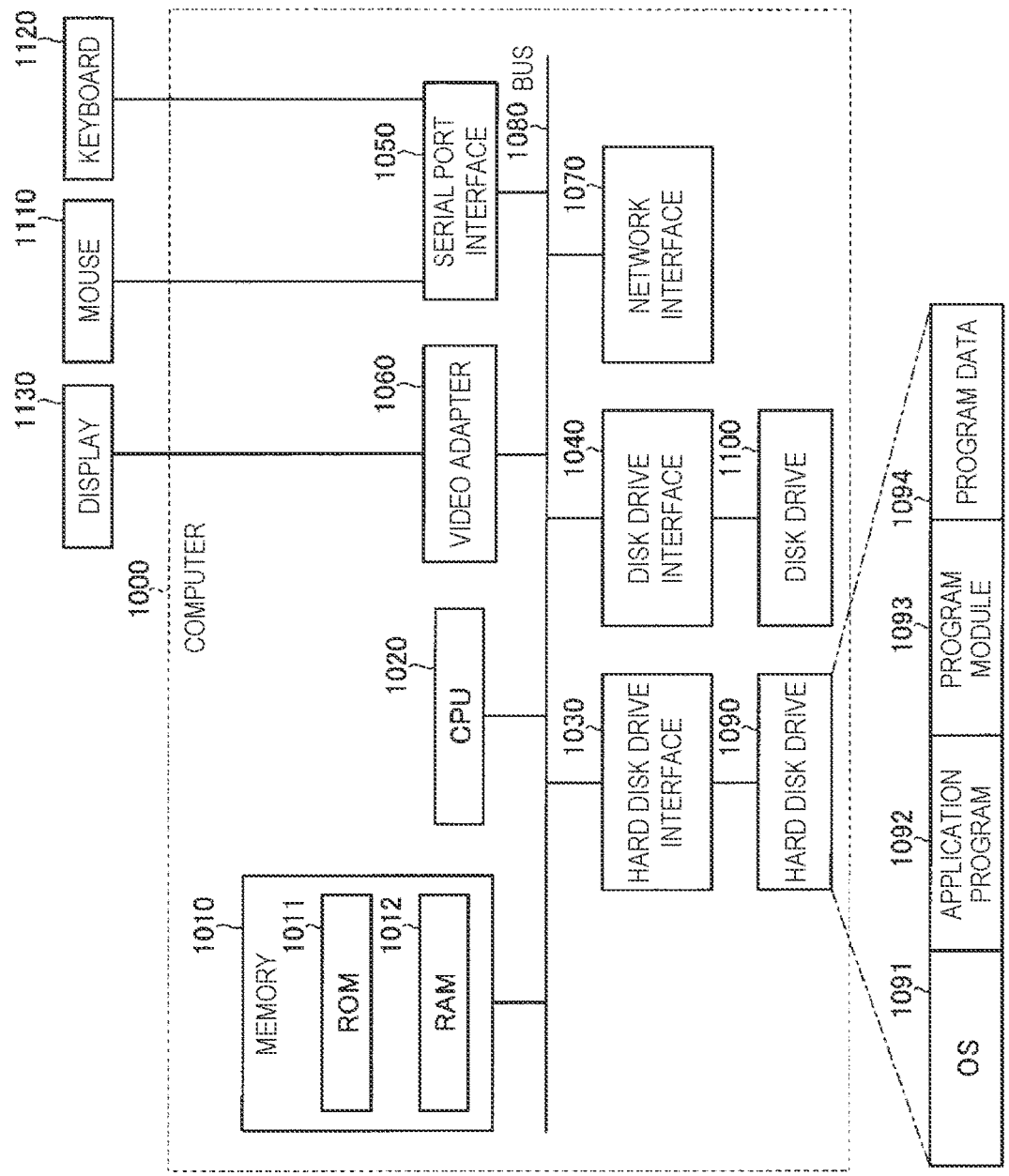
FIG. 8 is a diagram showing an example of a computer to execute an update program.

FIG. 8 is a diagram showing an example of the computer to execute the update program. A computer 1000 has, for example, a memory 1010, a CPU 1020, a hard disk drive interface 1030, a disk drive interface 1040, a serial port interface 1050, a video adapter 1060 and a network interface 1070. These units are connected via a bus 1080.

The memory 1010 includes a ROM (read-only memory) 1011 and a RAM 1012. The ROM 1011 stores, for example a boot program such as BIOS (basic input/output system). The hard disk drive interface 1030 is connected to a hard disk drive 1031. The disk drive interface 1040 is connected to a disk drive 1041. For example, a removable storage medium such as a magnetic disk and an optical disk is inserted into the disk drive 1041. To the serial port interface 1050, for example, a mouse 1051 and a keyboard 1052 are connected. To the video adapter 1060, for example, a display 1061 is connected.

Here, the hard disk drive 1031 stores, for example, an OS 1091, an application program 1092, a program module 1093 and program data 1094. Each piece of information described in the above embodiment is stored, for example, in the hard disk drive 1031 or the memory 1010.

Further, the update program is stored in the hard disk drive 1031, for example, as a program module 1093 in which commands to be executed by the computer 1000 are written. Specifically, the program module 1093 in which each process to be executed by the update device 10 described in the above embodiment is written is stored in the hard disk drive 1031.

Further, data to be used for information processing by the update program is stored, for example, in the hard disk drive 1031 as the program data 1094. Then, the CPU 1020 reads the program module 1093 and the program data 1094 stored in the hard disk drive 1031 as necessary and executes each procedure described above.

Note that the program module 1093 and the program data 1094 related to the update program may not be stored in the hard disk drive 1031 but may be stored, for example, in a removable storage medium and read out by the CPU 1020 via the disk drive 1041 or the like. Or alternatively, the program module 1093 and the program data 1094 related to the update program may be stored in another computer connected via a network such as a LAN and a WAN (wide area network) and read out by the CPU 1020 via the network interface 1070.

The embodiment to which the invention made by the present inventor is applied has been described above. However, the present invention is not limited to the description and the drawings forming a part of the disclosure of the present invention by the present embodiment. In other words, all of other embodiments, implementation examples, operation techniques and the like made by those skilled in the art based on the present embodiment are included in the scope of the present invention.

REFERENCE SIGNS LIST

10 Update device
11 Input unit
12 Output unit
13 Communication control unit
14 Storage unit
14a Package management information
14b Access control list (ACL)
15 Control unit
15a Identification unit
15b Addition unit

The invention claimed is:
1. An update device comprising:
processing circuitry configured to:

store package management information, wherein the package management information includes:
    associations between files and packages associated with the files, and
    information indicating existence/non-existence of dependence relationships among the packages;
store an access control list, wherein the access control list includes associations between the files and access source files permitted to access the files;
    when a combination of a file and an access source file is specified, refer to the package management information to identify a first package including the file and a package including the access source file, wherein the package management information includes dependency data, and the dependency data indicates that the first package needs the second package for the first package to execute; and
    when the first package including the file depends on the second package including the access source file according to the package management information, add the specified combination including the file and the access source file as permitted to access the file to the access control list.

2. The update device according to claim 1, wherein the processing circuitry is further configured to, when the first package including the file and the second package including the access source file are different from each other, output a warning.

3. The update device according to claim 1, wherein the processing circuitry is further configured to, when the first package including the file and the second package including the access source file are different from each other, modifying the addition of the specified combination to the access control list by rejecting the addition or acceptance of an instruction to permit the addition.

4. The update device according to claim 1, wherein the processing circuitry is further configured to, when the first package including the file and the second package including the access source file are different from each other, and the dependency data excludes the first package needs the second package or a third package for the first package to execute, add the specified combination to the access control list.

5. The update device according to claim 4, wherein the processing circuitry is further configured to, when the first package including the file and the second package including the access source file are different from each other, and the dependency data excludes the first package directly needs the second package or indirectly needs the second package via a third package for the first package to execute, output a warning.

6. The update device according to claim 4, wherein the processing circuitry is further configured to, when the first package including the file and the second package including the access source file are different from each other, and the dependency data excludes the first package directly needs the second package or indirectly needs the second package via a third package for the first package to execute reject addition or accept an instruction to permit/reject addition, instead of addition of the specified combination to the access control list.

7. An update method comprising:
storing package management information, wherein the package management information includes:
    associations between files and packages associated with the files, and
    information indicating existence/non-existence of dependence relationships among the packages;
store an access control list, wherein the access control list includes associations between the files and access source files permitted to access the files;
when a combination of a file and an access source file is specified, refer to the package management information to identify a first package including the file and a package including the access source file, wherein the package management information includes dependency data, the dependency data and the dependency data indicates that the first package needs the second package for the first package to execute; and
when the first package including the file depends on the second package including the access source file according to the package management information, add the specified combination including the file and the access source file as permitted to access the file to the access control list.

* * * * *